July 7, 1970
C. K. HANYEN ET AL
3,518,994
LAMINATED COLLAGEN SUTURE
Filed Nov. 14, 1966
5 Sheets-Sheet 1
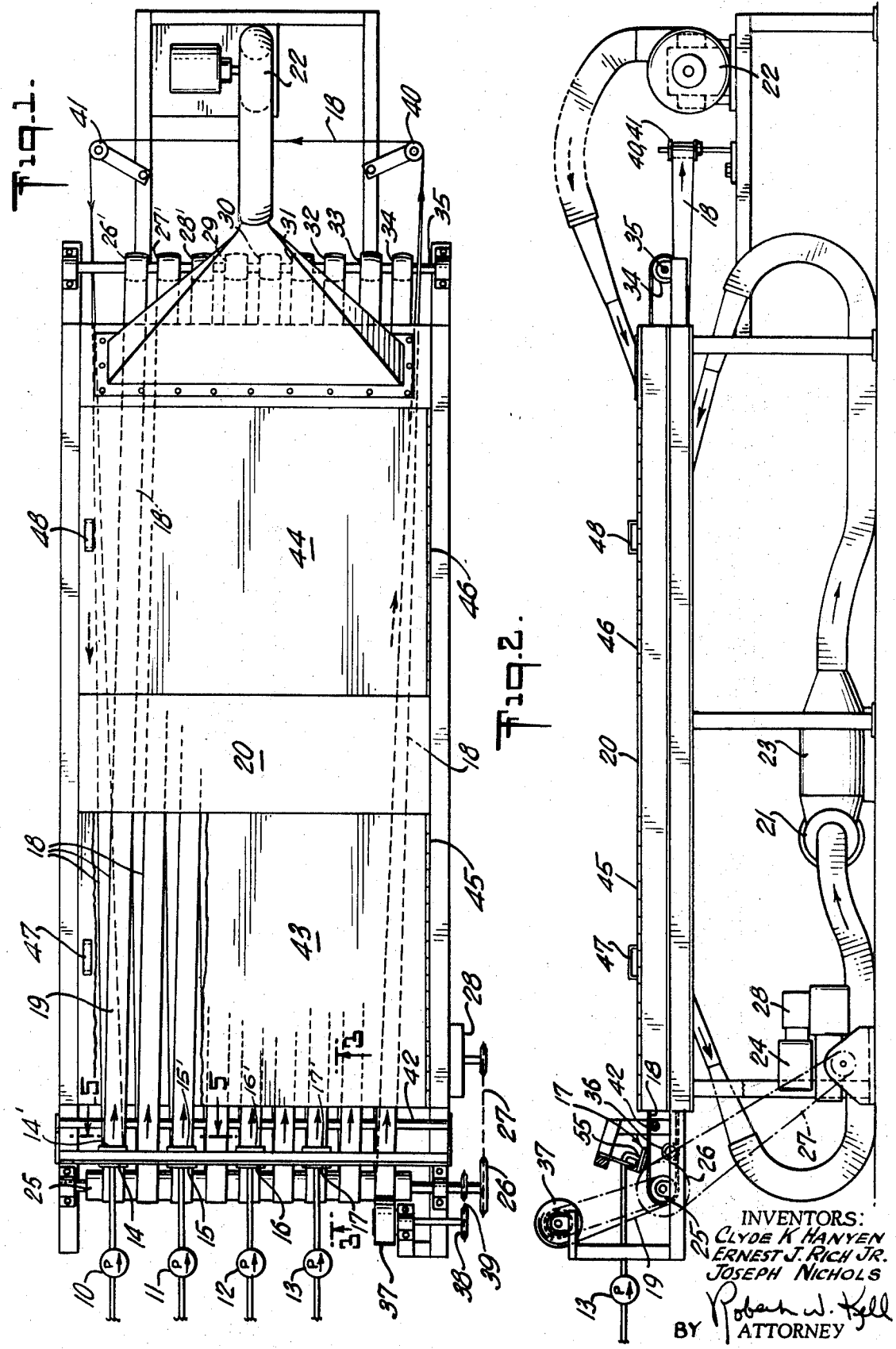
INVENTORS:
CLYDE K HANYEN
ERNEST J. RICH JR.
JOSEPH NICHOLS
BY ATTORNEY

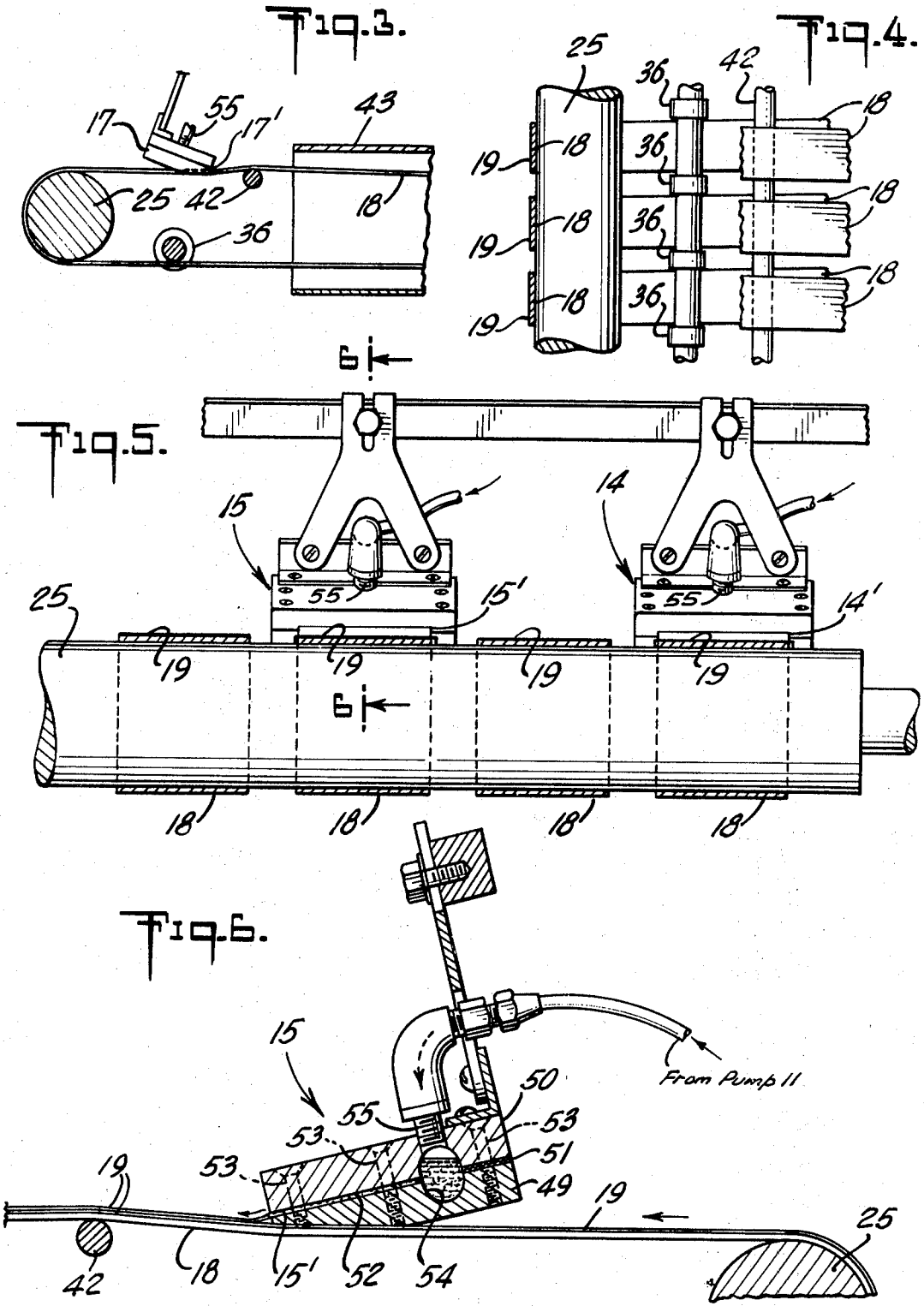

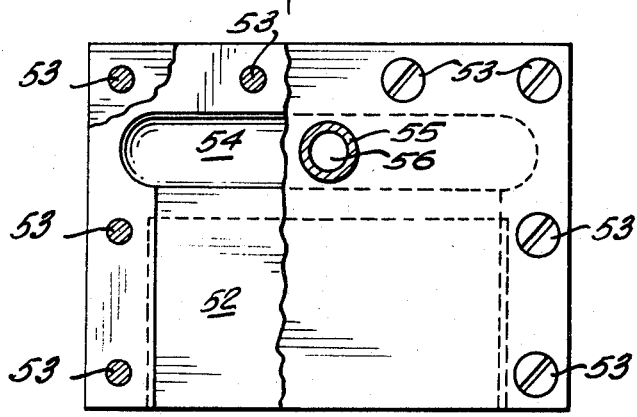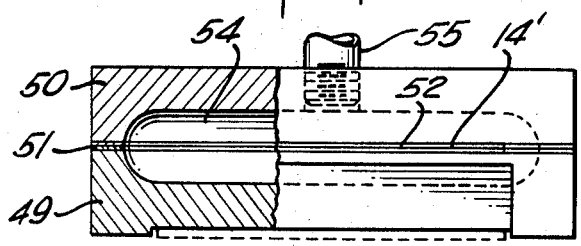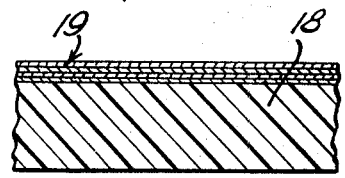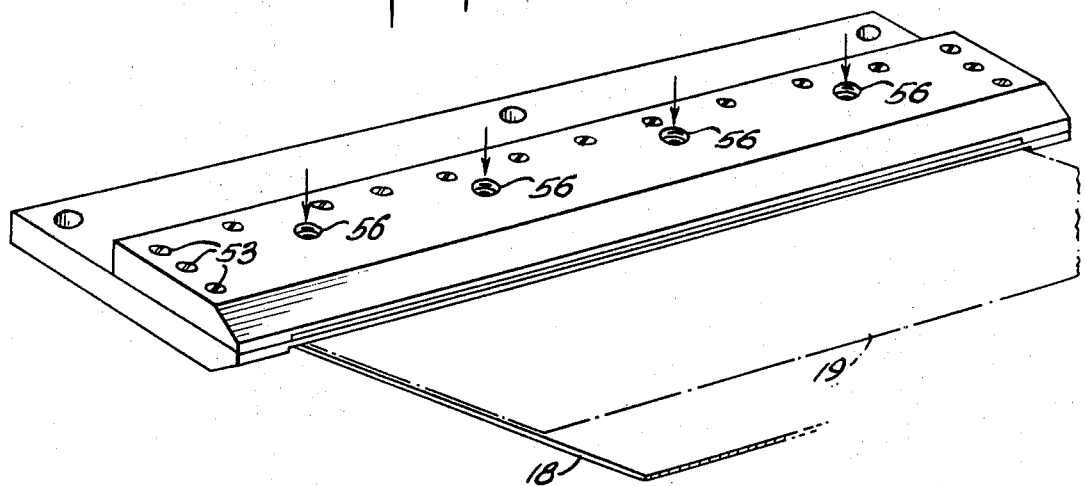

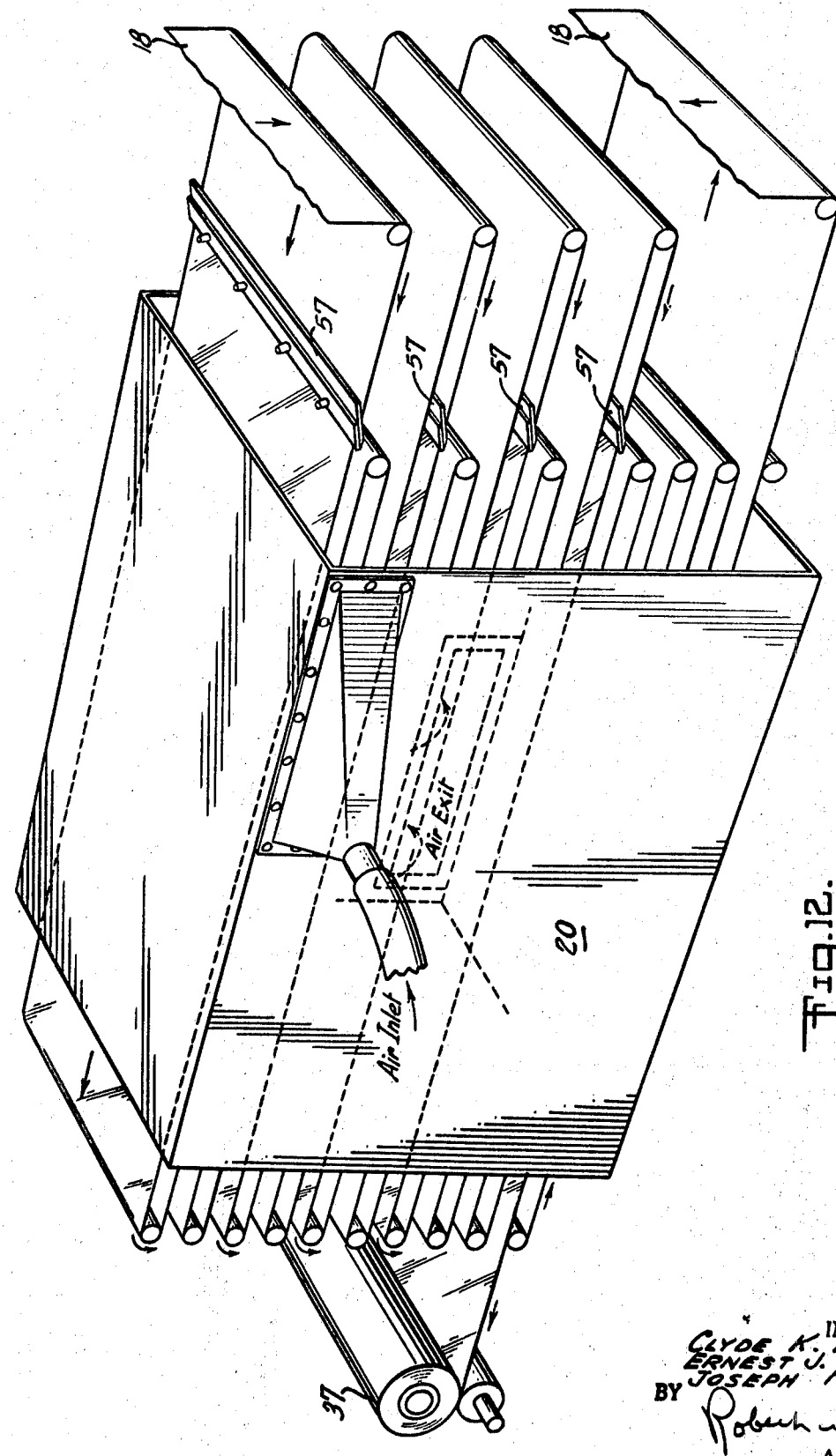

July 7, 1970  C. K. HANYEN ET AL  3,518,994
LAMINATED COLLAGEN SUTURE

Filed Nov. 14, 1966  5 Sheets-Sheet 5

INVENTORS:
CLYDE K. HANYEN
ERNEST J. RICH JR.
BY JOSEPH NICHOLS

ATTORNEY

United States Patent Office 3,518,994
Patented July 7, 1970

3,518,994
LAMINATED COLLAGEN SUTURE
Clyde K. Hanyen, Somerville, Joseph Nichols, Princeton, and Ernest J. Rich, Jr., Glen Gardner, N.J., assignors to Ethicon, Inc., a corporation of New Jersey
Continuation-in-part of application Ser. No. 330,088, Dec. 12, 1963. This application Nov. 14, 1966, Ser. No. 593,894
Int. Cl. A61l 17/00
U.S. Cl. 128—335.5
2 Claims

ABSTRACT OF THE DISCLOSURE

A laminated collagen sheet is produced by extruding acid-swollen collagen fibrils under conditions which orient the fibrils within the individual laminae of the collagen sheet. The individual collagen fibrils that compose each lamina are undulated and exhibit typical banding at intervals of approximately 640 Angstrom units. Substantially, all of the collagen fibrils that comprise the collagen sheet have an alignment parallel to the longitudinal axis of the lamina which contains them. Each of said laminae is disposed in parallel contiguity with other laminae and bonded along contiguous surfaces to form a unitary structure having a longitudinal axis in substantial parallelism with the longitudinal axis of the various laminae therein. The laminated collagen sheet is cut to form a tape which is convoluted about its longitudinal axis and bonded to form a collagen suture circular in cross-section.

---

This invention relates to a laminated collagen sheet or film and more specifically to a sheet-like, extruded, laminated, collagen structure and to a method of manufacturing the same. The laminated collagen sheet of the present invention is useful in the manufacture of absorbable sutures and ligatures. The present application is a continuation-in-part of copending application Ser. No. 330,-088, filed Dec. 12, 1963, now abandoned.

In U.S. Pat. No. 3,114,372 (Ser. No. 102,533, filed Apr. 12, 1961) is described a process for extruding a dispersion of swollen collagen fibrils into an acetone dehydrating bath to form a multifilament. The multifilament may subsequently be bonded and twisted to form a round strand that is useful as an absorbable surgical suture.

While the process referred to above offers numerous important advantages over the manufacture of sutures from animal intestines and results in a product that is superior to conventional "catgut," the extrusion of collagen multifilament into acetone requires all of the precautions that must be observed in the handling and recovery of inflammable solvents. Moreover, the spinnerettes that are required in such a process must be constructed with extremely small orifices, the size of which restricts the rate of extrusion and requires extraordinary precautions to avoid plugging. The above disadvantages could be largely eliminated by extruding and air drying a collagen sheet.

Collagen in sheet form is also easier to store, handle, and ship than the collagen tapes and strands described in the U.S. patent identified above. However, early attempts to prepare a collagen sheet that could be cut into strips and twisted to form strands useful in surgery were not satisfactory because the ultimate product lacked the knot strength and tensile strength required of a surgical suture.

It is an object of the present invention, therefore, to provide a laminated collagen sheet or film having unusual physical properties which may be cut to form tapes that can be twisted and united to form a continuous collagen strand suitable for use as a surgical suture.

It is also an object of this invention to provide a laminated collagen sheet having a specific structure and having certain desired physical characteristics by continuously extruding a dispersion of swollen collagen fibrils onto a belt moving at such a rate as to orient the collagen fibrils as they leave the extrusion head and prior to contact with the moving belt.

It is a further object of this invention to provide a laminated sheet of oriented collagen fibrils that may be easily converted to a continuous unitary strand having characteristics superior to surgical sutures derived from gut.

The objects of this invention may be realized by causing a homogeneous dispersion of acid-swollen collagen fibrils to flow under pressure through a constricted zone thereby partially aligning said fibrils in the direction of flow. The partially-aligned collagen fibrils are extruded through a slit to form a sheet that is stretched prior to contact with a moving belt to further orient the collagen fibrils in the direction of extrusion. It has been postulated that the ultimate strength of an extruded collagen article is related to the lateral bonds between collagen fibrils. Thus, a parallel alignment of the individual rectilinear fibrils is highly desirable as such an arrangement will provide the maximum number of lateral bonds and the maximum straight tensile strength. It is a disadvantage of such a highly-ordered collagen structure, however, that it is stiff; and collagen sutures that are so constituted are lacking in flexibility, i.e., the largest sizes do not have the desirable "hand" that is characteristic of the smaller sizes.

The moving belt is passed through an enclosure, and the collagen sheet supported thereon is dried in a moving stream of air. It is an important feature of the present invention that minimal amounts of the acid component of the collagen dispersion remains in the collagen film after the drying step. Thus, the amount of residual acid in the laminated collagen sheet does not exceed 8 percent based on the weight of the collagen. The thickness of the collagen sheet is increased by depositing on the dried collagen sheet additional layers of the homogeneous dispersion of swollen collagen fibrils. In this manner, a laminated structure of the desired thickness is constructed composed of collagen sheets that are united, each to the other.

It will be understood that the thickness of the collagen sheet may be regulated by the width of the slit in the extrusion head; the volumetric rate at which the homogeneous dispersion of swollen collagen fibrils is extruded, the speed of the moving belt, and the number of layers of collagen applied to the belt.

The collagen sheet after it is removed from the belt may be further processed to provide a surgical suture by slitting the film to form a tape having substantially greater width than thickness, tanning the tape, and twisting the tape to form a rounded strand having a uniform, circular cross-section.

The basic raw material entering into the manufacture of extruded collagen sheets of the present invention consists of a dispersion of swollen collagen fibrils which may originate in different animal species or in different tissues within a single species. These collagen fibrils are characterized by having a uniform diameter, a periodic cross-banding measuring about 640 Angstroms and the ability to swell reversibly in aqueous acid solution. Collagen fibrils from beef leg tendon are preferred.

It is important in preparing a dispersion of swollen collagen fibrils suitable for extrusion that the removal of impurities naturally present in mammalian tendon and the separation of the longitudinally arranged fibrils to form a homogeneous dispersion be effected under conditions that avoid solution or degradation of the collagen fibrils. The tensile strength of the extruded product is dependent upon retaining the original collagen fibril in structure.

In swelling the collagen fibrils to produce a dispersion thereof, a mixture of acids having different vapor pressures may be employed. An acid, such as, cyanoacetic acid, that will swell the collagen fibrils without degrading the same at temperatures below about 25° C., must be used in preparing the collagen dispersion. This acid, i.e., cyanoacetic, may be present in the collagen dispersion to the extent of from about 3 percent to about 8 percent based on the weight of the collagen solids.

Those acids, such as, cyanoacetic acid, that are known not to degrade the collagen fibril have a low vapor pressure and are not completely volatilized with the water present in the dispersion when the extruded collagen film is dried. As indicated above, the collagen fibrils may be swollen and homogenized with as little as about 3 percent cyanoacetic acid based upon the weight of collagen. However, if less than about 8 percent cyanoacetic acid is used, it becomes difficult to swell and homogenize the collagen. Accordingly, another more volatile, weak organic acid, such as, acetic acid or propionic acid, having a vapor pressure at 25° C. of at least about 4 mm. may be used to aid in swelling and dispersing the collagen fibrils. The exact amount of the more volatile organic acid used will depend upon its equivalent weight and ionization constant as well as the amount of nonvolatile acid present in the swelling mixture. The amount of the volatile acid should be sufficient to provide adequate swelling of the collagen fibrils, i.e., as much as about 45 percent based upon the weight of collagen if only 3 percent cyanoacetic acid is present in the swelling mixture. Larger amounts of volatile organic acid than are required to improve the swelling action should be avoided.

The invention will appear more clearly from the following detailed description when taken in connection with the accompanying drawings, which show by way of example preferred embodiments of the inventive idea.

Referring now to the drawings:

FIG. 1 is a top plan view of the apparatus embodying the invention.

FIG. 2 is a side elevation thereof.

FIG. 3 is a fragmental horizontal cross-section on an enlarged scale taken in the lines 3—3 of FIG. 1.

FIG. 4 is a plan view of parts shown in FIG. 3, some parts being broken away and in cross-section.

FIG. 5 is a vertical cross-section of the extruder heads and their mountings taken on lines 5—5 of FIG. 1.

FIG. 6 is a transverse section taken on the lines 6—6 of FIG. 5.

FIG. 7 is a top plan view of an extruder head, parts being shown broken away and in cross-section.

FIG. 8 is a front view of FIG. 7 partly in elevation and partly in section.

FIG. 9 is an enlarged cross-section of the conveyor belt showing the first deposit of collagen in place.

FIG. 10 is a view similar to FIG. 9 showing multiple deposits of collagen.

FIG. 11 is a modified form of extruder head adapted to extrude wide sheets of collagen.

FIG. 12 is a view of a modified form of the apparatus of FIG. 1 adapted to produce wide sheets of collagen.

Figure 13:
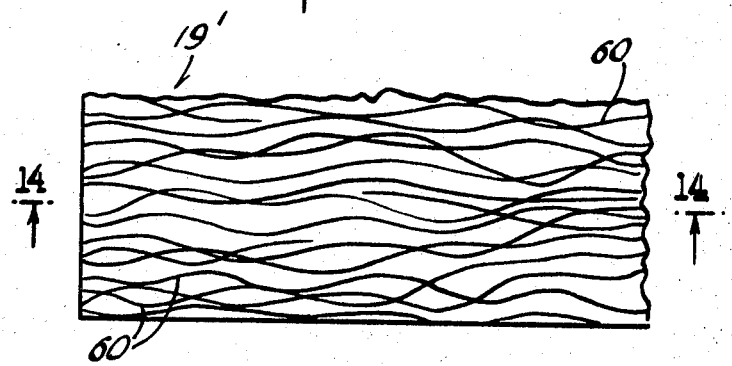
FIG. 13 is a greatly magnified portion of a single lamina of a collagen sheet in plan and illustrates the orientation of collagen fibrils in a plane parallel to the surface of the lamina.

Referring now to FIGS. 1–6, it will be understood that the extrusion apparatus is designed to move a homogeneous mass of swollen collagen fibrils under pressure applied by pumps 10, 11, 12, and 13 through constricted zones thereby partially aligning the fibrils flowing therethrough and orienting said fibrils in the direction of flow. The extruder heads 14, 15, 16, and 17 are in register with an endless moving belt 18 and extrude the partially aligned collagen fibrils through slits 14', 15', 16', and 17' to form a film 19' that is stretched from about 100 percent to about 300 percent by the moving belt. As additional layers of collagen are extruded, a laminated collagen sheet 19 is formed, the thickness of which increases with each additional application of collagen. The collagen sheet 19 adheres to the surface of the belt 18 and is conveyed by the belt through the enclosure 20. The top sections of this enclosure 43 and 44 are joined to one side thereof by the hinge 45 and 46 permitting both sections to be raised by the handles 47 and 48 for access to the interior thereof. While moving through the enclosure, the collagen sheet is dried by moving currents of air from the blowers 21 and 22. The temperature of the air within the enclosure 20 may be controlled by the heater 23.

Referring specifically to FIGS. 1 and 2, it will be noted that a motor 24 drives the cylinder 25 through the fixed sprocket wheel 26, chain 27, and gear reduction box 28. The linear speed of the belt 18 is directly related to the rotational speed of the cylinder 25 which is controlled through the gear box 28. In the modification illustrated by FIG. 1, the belt traverses the enclosure 16 times passing between the driven cylinder 25 and the idler rollers 26', 27', 28', 29, 30, 31, 32, 33, and 34 mounted for rotation on the axle 35. Alignment of the moving belt on the cylinder 25 is maintained by means of the guide rollers 36, best illustrated in FIGS. 3 and 4. The laminated collagen sheet which has been deposited on the belt and dried by repeated passes through the enclosure 20 is removed from the belt by the take-up roller 37 driven from the cylinder 25 through a fixed sprocket wheel 38, drive chain 39, and a friction clutch (not shown). From this take-up roll, the moving belt 18 traverses the enclosure 20 passing around the pulleys 40 and 41 which are adjustable to maintain the desired tension on the moving belt. The tension of the belt against the extruder heads 14, 15, 16, and 17 may be controlled by adjusting the vertical position of the tension rod 42.

The extrusion heads 14, 15, 16 and 17 are of similar construction, and as indicated in FIGS. 7 and 8, are formed of two metal plates 49 and 50 separated by one or more thin metal shims 51 to form a constricted zone or chamber 52 through which the swollen collagen fibrils flow under pressure toward the extrusion slit 14'. The plates 49 and 50 are fastened together by the bolts 53 and are recessed to provide a reservoir 54 that is remote from the exit slit 14'. The mass of swollen collagen fibrils enters the reservoir 54 by means of the conduit 55 which is threaded into an entry port 56 in the top plate 50. The collagen fibrils flow under pressure from the reservoir 54 to the exit slit 14' through the constricted zone 52 and are thereby aligned in the direction of flow.

A modification of the extrusion head 14 adapted to extrude a collagen sheet about 18 inches in width is shown in FIG. 11. The structure of this wide extrusion head is similar to that illustrated in FIGS. 7 and 8, except that additional entry ports 56 have been provided to maintain constant the collagen dispersion throughout the length of the reservoir.

FIG. 12 illustrates a modification of the extrusion apparatus of FIG. 1 adapted to utilize the wide extruder head 57. The drive mechanism for the moving belt and the means for circulating air through the enclosure is not shown in FIG. 12, but it will be understood that the principal of operation is the same as that described above; the endless belt 18 moving through the enclosure 20 to dry the collagen sheet that has been applied to the surface thereof from the extruder head 57, the dried collagen sheet being removed from the belt by the take-up roll 37. The belt 18 employed in the practice of the present invention is preferably (Mylar) a highly durable, transparent, water-repellent film of polyethylene terephthalate resin as the deposited collagen will adhere to this material during the drying process, and the dry collagen sheet may be stripped off the belt without tearing or other difficulty when it has reached the desired thickness.

Polypropylene, the surface of which has been treated to accept ink, also has suitable release characteristics for the dried collagen sheet and a belt faced with Moplefane brand polypropylene sold by the Chemore Corporation, 100 E. 42nd St., New York, N.Y. may be used.

EXAMPLE I

Preparation of collagen dispersion

Twenty-four hundred parts of the deep flexor tendon of young steers is cleaned of fat, non-collagenous protein, and other extraneous matter, sliced to a thickness of 23 mils and treated with 24,000 parts of an aqueous solution containing 24 parts (0.1 percent) ficin and 9.98 parts (0.001 M) of the tetrasodium salt of ethylenediaminetetracetic acid. The tendon slices analyze 37.1 percent total solids, equivalent to 890.4 parts on a dry weight basis. The pH of the enzyme solution is 6.2. After standing for 17 hours at room temperature, the enzyme solution is decanted, and the tendon slices are stirred with 24,000 parts of water containing 80 parts of 30 percent hydrogen peroxide. The hydrogen peroxide solution is drained off, and the tendon slices are added to an aqueous methanol solution of cyanoacetic acid made up by adding 51,354.8 parts of methanol and 378 parts of cyanoacetic acid to 49,085.2 parts of water. The amount of cyanoacetic acid in this solution is equivalent to 0.5 mole of acid for each 100 parts of dry solids, and the tendon solids amount to 0.86 percent by weight of the total mixture. The tendon slides are agitated with this acid aqueous methanol mixture for 3 hours at 80 r.p.m. with cooling. The mixture is then circulated through a ½-inch pipe for 1 hour, through ⅛-inch jets for another hour, and through 60-mil jets for ½-hour, as a result of which the collagen fibrils are swollen and dispersed in the aqueous acid methanol solution which forms the continuous phase of the dispersion. The dispersion is then filtered through a leaf filter containing 15-, 9-, and 5.5-mil screens and deaerated under vacuum. The pH of this dispersion of swollen collagen fibrils is 2.8.

EXAMPLE II

Extrusion of collagen sheet

The apparatus illustrated in FIGS. 1 and 2 is used to extrude the dispersion of swollen collagen fibrils described in Example I above. The slit opening in the extruder heads 14, 15, 16, and 17, the speed of the belt 18, and the volumetric rate of extrusion (cubic centimeters of dispersion per minute) through each of the slits 14', 15', 16', 17' may be varied as indicated in Table I below to produce a laminated collagen sheet about 2 mils in thickness. Air at 75° F. (relative humidity 55 percent) is circulated through the enclosure 20, and the collagen sheet is collected on the take-up spool 37.

The collagen sheet from the take-up spool is washed with methanol to remove cyanoacetic acid, air dried, and stored for further processing.

TABLE 1

| Sample No. | Slit opening, mils | Belt speed, ft./min. | Film thickness, mils | Gel pump speed, cc./min. | Number of laminations | Number of heads | Number of passes |
|---|---|---|---|---|---|---|---|
| CST 20 | 4 | 4.8 | 2.0 | 5.95 | 72 | 4 | 18 |
| CST 21 | 4 | 4.8 | 2.0 | 8.22 | 52 | 4 | 13 |
| CST 22 | 20 | 4.8 | 2.0 | 5.95 | 72 | 4 | 18 |
| CST 23 | 20 | 4.8 | 2.0 | 8.22 | 52 | 4 | 13 |
| CST 24 | 20 | 1.2 | 2.0 | 5.95 | 18 | 3 | 6 |
| CST 25 | 20 | 1.2 | 2.0 | 8.22 | 13 | 4 | [1] 3¼ |
| CST 26 | 4 | 1.2 | 2.0 | 5.95 | 18 | 3 | 6 |
| CST 27 | 4 | 1.2 | 2.0 | 8.22 | 13 | 4 | [1] 3¼ |
| CST 28 | 12 | 3.0 | 2.0 | 7.07 | 38 | 4 | [2] 9½ |
| CST 29 | 12 | 3.0 | 2.0 | 7.07 | 38 | 4 | [2] 9½ |
| CST 30 | 12 | 3.0 | 2.0 | 7.07 | 38 | 4 | [2] 9½ |
| CST 31 | 12 | 3.0 | 2.0 | 7.07 | 38 | 4 | [2] 9½ |

[1] Three passes made with four extrusion heads in use and one pass with extrusion head 14 in use.
[2] Extrusion heads 15 and 17 were removed after nine passes and extrusion heads 14 and 16 are used for one more pass.

EXAMPLE III

Processing collagen sheet

The collagen sheets obtained as described in Example II above may be further processed to form strands adapted for use as absorbable sutures. Such collagen sheets, essentially free of cyanoacetic acid are cut longitudinally so that the cut parallels the direction of orientation of the collagen fibrils into tapes of substantially greater length than width. The collagen tapes are then tanned, stretched, twisted, and dried to form a uniform strand. Apparatus suitable for converting collagen tape to a round and tanned strand is illustrated and described in U.S. Pat. No. 3,114,372.

The collagen tape is processed on the apparatus shown in FIG. 29 of U.S. Pat. No. 3,114,372. The tanning bath 104 is a solution of chromium (III) sulfate comprising 3.6 parts of chromic sulfate $(Cr_2(SO_4)_3 \cdot XH_2O)$, 0.84 part sodium hydroxide, 0.2 part of formaldehyde, 0.2 part of pyrogallol, and 95.06 parts of deionized water. This tanning solution contains 1.0 percent chromium determined as $Cr_2O_3$.

In passing through the tanning bath, the tape is impregnated with the tanning agent substantially uniformly throughout its length and to a degree depending upon the distance from the surface of the tape. The tape after it leaves the tanning bath 104 is substantially uniformly tanned throughout. It is dried with warm air in the tube 84, stretched by the godet 102, wet out with distilled water from the drip-tubes 76 and 78, and twisted by the false twister 80. The false twister convolutes the tanned tape about its longitudinal axis and in passing through the heated tubes 85 and 86, the tape is dried with each convolution being bonded to adjacent convolutions. The twisted tape is also stretched between the godets 102 and 103 and is then collected on the take-up spool 77.

The collagen strands so obtained are cut into five-foot lengths, packaged in tubing fluid, and electron-beam sterilized. The physical properties of the sterile sutures are summarized in Table 2 below. The strengths indicated in Table 2 are in each instance the average value determined from fifteen tests.

not exceed 6 percent based upon the weight of the collagen sheet 19.

Figure 14:
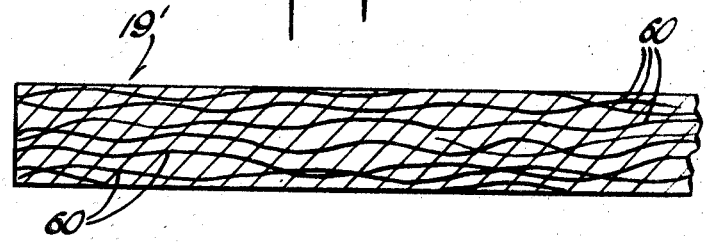
FIG. 14 is a cross-section therethrough on the line 14—14 of FIG. 13.
Figure 15:
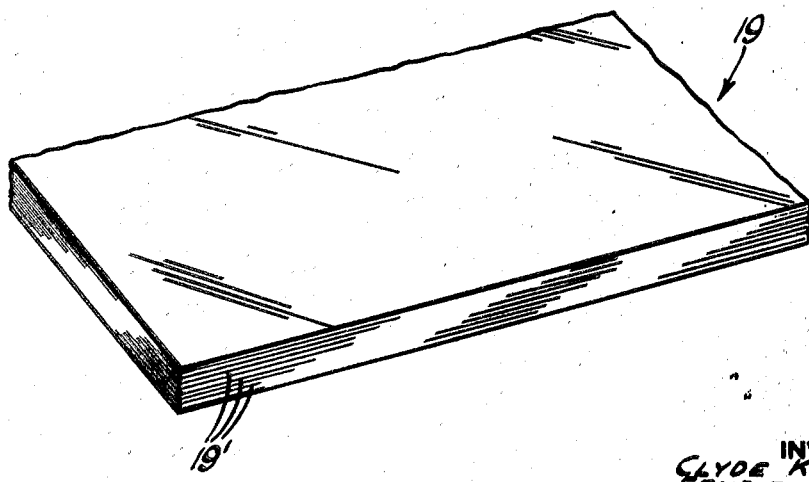
FIG. 15 is a fragmentary perspective view of a laminated collagen sheet showing a series of the laminae illustrated in FIGS. 13 and 14.

FIGS. 13 through 15 of the drawings illustrate the

TABLE 2

| | Deniers, diameters, and tensiles of finished sutures | | | | | | | | Chemical analyses of tapes and sutures | | |
|---|---|---|---|---|---|---|---|---|---|---|---|
| | | | Dry straight | | Dry knot | | Wet knot | | Finished suture (percent) | | |
| Sample No. | Denier | Diam., mils | Test, lbs. | Lbs./ 1,000 D. | Test, lbs. | Lbs./ 1,000 D. | Test, lbs. | Lbs./ 1,000 D. | Pyrogallol | Formaldehyde | Cr. O. |
| CST 20 | 1,250 | 15.7 | 8.50 | 6.80 | 3.59 | 2.87 | 3.01 | 2.41 | 0.45 | 0.036 | 0.96 |
| CST 21 | 1,010 | 14.7 | 7.42 | 7.34 | 3.41 | 3.38 | 2.79 | 2.76 | 0.66 | 0.059 | 1.37 |
| CST 22 | 1,090 | 14.5 | 6.92 | 6.35 | 3.52 | 3.23 | 2.93 | 2.69 | 0.60 | 0.088 | 1.28 |
| CST 23 | 1,110 | 14.8 | 6.76 | 6.09 | 3.64 | 3.28 | 2.98 | 2.68 | 0.40 | 0.042 | 1.07 |
| CST 24 | 1,010 | 14.9 | 9.25 | 9.16 | 4.20 | 4.16 | 3.50 | 3.47 | 0.44 | 0.056 | 1.34 |
| CST 25 | 1,010 | 14.8 | 6.80 | 6.73 | 3.37 | 3.34 | 2.86 | 2.83 | 0.43 | 0.085 | 1.03 |
| CST 26 | 1,120 | 15.0 | 7.26 | 6.48 | 3.46 | 3.09 | 2.65 | 2.37 | 0.38 | 0.061 | 0.73 |
| CST 27 | 1,080 | 15.2 | 7.24 | 6.70 | 3.24 | 3.00 | 2.65 | 2.45 | 0.62 | 0.087 | 1.48 |
| CST 28 | 1,200 | 14.8 | 8.42 | 7.02 | 3.61 | 3.01 | 3.35 | 2.79 | 0.26 | 0.041 | 0.65 |
| CST 29 | 1,030 | 15.0 | 7.90 | 7.67 | 3.39 | 3.29 | 2.85 | 2.77 | 0.73 | 0.047 | 0.97 |
| CST 30 | 1,210 | 14.2 | 9.40 | 7.77 | 4.11 | 3.40 | 3.59 | 2.97 | 0.95 | 0.059 | 1.35 |
| CST 31 | 1,190 | 13.9 | 10.50 | 8.82 | 4.39 | 3.69 | 3.40 | 2.86 | 0.77 | 0.047 | 1.61 |

EXAMPLE IV

Homogeneous mixtures of swollen collagen fibrils are prepared by the general method described in Example I above. The compositions contain up to 6 percent by weight of cyanoacetic acid and as much as 30 percent by weight acetic acid (based on collagen solids). Such mixtures are extruded with the apparatus illustrated in FIGS. 1 and 2 at the volumetric rate of 35.8 cc. per minute (0.7 linear feet per minute) onto a belt that moves at a rate designed to stretch the extruded collagen sheet about 100 percent to about 300 percent of its length. The thickness of the collagen lamina deposited on the belt when extruding at the rate of 0.7 feet per minute is dependent on the collagen solids and the amount of stretch (belt speed).

When employing a mixture containing 1.5 percent by weight of swollen collagen fibrils, the thickness of each collagen sheet deposited (each lamina) is:

| Belt speed | Percent stretch | Thickness (mils) |
|---|---|---|
| 1.4 | 100 | 0.0625 |
| 2.1 | 200 | 0.0468 |
| 2.8 | 300 | 0.0312 |

From about 10 to about 56 collagen laminae 19' may be present in a sheet 19 of collagen. The volatile acid that may be present in the collagen mixture that is extruded is volatilized with the water and methanol leaving a residue of cyanoacetic acid which in the present example does structure of the collagen sheets that are prepared in accordance with this example. The extruded collagen fibrils 60 that constituted any single lamina 19' of the collagen sheet 19 are generally oriented in a single direction that corresponds with the direction of extrusion and direction of stretch (the direction in which the belt moves). These collagen fibrils are not rectilinear as described in U.S. Pat. No. 3,114,372, however, but are undulating or sinusoidal when observed at high magnification. The 640 Angstrom spacing that is characteristic of the collagen fibrils in their native state may be readily distinguished by examining in an electron microscope the collagen sheets prepared as described in this example.

The collagen sheets of this example are slit parallel to the direction of extrusion, and the collagen tape so obtained is tanned and twisted by the procedure described in U.S. Pat. No. 3,189,401 to form a round strand. The tanning solution contains 1.5 percent $CR_2O_3$, 0.2 percent pyrogallol, 0.06 percent formaldehyde, and 0.1 percent formaldehyde sodium sulfoxylate (Formopon). The residual cyanoacetic acid (or other non-volatile acid) in the collagen tape results in rapid swelling in the tanning bath and efficient tanning. The moving tape is wet out with an aqueous solution containing 1.5 percent sodium carboxymethyl cellulose before it contacts the false twister, and the rounded strand is treated with an emulsion of castor oil and heated at a temperature of 137° C. for 1 hour. Information relative to the collagen sheets manufactured in accordance with this example and chrome-tanned sutures prepared therefrom is presented in Tables 3 and 4.

TABLE 3

| Sample No. | Swelling acid | Percent stretch [1] | Tape thickness, mils | Tape width, mils | Percent collagen solids | Number of laminations | Number of heads | Number of passes |
|---|---|---|---|---|---|---|---|---|
| NF 6 | (a) | 91 | 1.0 | 146 | 0.81 | 32 | 4 | 8 |
| NF 15 | (b) | 315 | 1.0 | 146 | 0.81 | 48 | 4 | 12 |
| NF 16 | (b) | 315 | 1.0 | 146 | 0.82 | 48 | 4 | 12 |
| NF 27 | (b) | 315 | 1.3 | 144 | 1.14 | 48 | 4 | 12 |
| NF 36 | (b) | 300 | 2.0 | 144 | 1.5 | 64 | 4 | 16 |
| NF 44 | (b) | 121 | 0.7 | 86 | 1.53 | 8 | 4 | 2 |
| NF 48 | (b) | 200 | 1.3 | 270 | 1.5 | 28 | 4 | 7 |
| NF 49 | (b) | 200 | 2.4 | 144 | 1.38 | 56 | 4 | 14 |
| NF 66 | (b) | 200 | 1.2 | 188 | 1.37 | 28 | 4 | 7 |
| NF 78 | (b) | 200 | 1.1 | 144 | 1.30 | 27 | 4 | 6¾ |

[1] Pump speed 3.58 cc. per minute; slit opening in extruder 10 mils.
(a) 6 percent cyanoacetic acid.
(b) 6 percent cyanoacetic acid and 30 percent acetic acid.

TABLE 4

| | Deniers, diameters, and tensiles of finished sutures | | | | | Chemical analyses of tapes and sutures | | |
|---|---|---|---|---|---|---|---|---|
| | | | | | | Finished suture (percent) | | |
| Sample No. | Denier | Diameter, mils | Dry straight, test lbs. | Dry knot, test lbs. | Wet knot, test lbs. | Size | Pyrogallol | Formaldehyde | Cr. O. |
| NF 6 | 750 | 12.66 | 6.7 | 3.55 | 2.70 | 3/0 | | | |
| NF 15 | 810 | 12.53 | 8.3 | 3.76 | 3.1 | 3/0 | 1.2 | 0.031 | 1.36 |
| NF 16 | 800 | 12.47 | 7.5 | 3.87 | 2.64 | 3/0 | 0.11 | 0.029 | 1.10 |
| NF 27 | 1,050 | 14.17 | 8.22 | 4.39 | 3.7 | 2/0 | 0.87 | 0.047 | 1.70 |
| NF 36 | 1,700 | 17.96 | 12.22 | 6.89 | 5.55 | 0 | 0.40 | 0.064 | 1.09 |
| NF 44 | 367 | 5.72 | 1.99 | 1.18 | 0.91 | 5/0 | 0.41 | 0.030 | 0.78 |
| NF 48 | 1,813 | 18.59 | 15.84 | 7.24 | 5.2 | 0 | 0.47 | 0.037 | 0.76 |
| NF 49 | 2,730 | 20.6 | 21.96 | 10.1 | 6.41 | 1 | 9.48 | 0.035 | 1.05 |
| NF 66 | 1,330 | 16.63 | 11.58 | 6.04 | 3.80 | 2/0 | 0.47 | 0.30 | 1.17 |
| NF 78 | 1,020 | 13.92 | 9.06 | 4.54 | 3.63 | 2/0 | 0.40 | 0.055 | 1.63 |

The individual lamina 19' which constitute collagen film 19 of the present invention are bonded to adjacent lamina contiguous thereto throughout the entire extent of their contiguity.

As the direction of extrusion of each successively extruded lamina is the same, the collagen fibrils in each individual lamina are in general alignment with the collagen fibrils in all other aminae. The stretch applied to the collagen film at the time of extrusion is not less than about 90 percent nor more than about 315 percent. This results in an undulating arrangement of the collagen fibrils within individual lamina rather than a rectilinear arrangement. This more relaxed arrangement of collagen fibrils imparts unusual characteristics to the resulting product and sutures derived therefrom. Sutures that are made from the slit collagen sheet (collagen tape) of the present invention, by procedures described above, are found to have an improved flexibility and somewhat better hand, particularly in the large sizes, than sutures wherein the individual colagen fibrils are rectilinear.

It has been noted that the residual cyanoacetic acid (from about 3 to about 8 percent) that remains in the collagen sheet after the drying step does not degrade or cause any morphological alteration to the collagen fibrils even upon prolonged aging of the sheet. The collagen sheet may consequently be shipped and stored for long periods of time prior to use. Moreover, the residual acid is an advantage when finishing collagen tape to form sutures as it improves the swelling of the collagen in the tanning bath and permits the tanning agent to impregnate the collagen tape substantially uniformly throughout all laminae. Thus, when the tanned collagen tape is twisted to form a round strand, the concentration of the tanning agent at the center of the strand is similar to that at the surface thereof.

While the invention has been described in detail according to the preferred manner of carrying out the process and yielding the products, it will be obvious to those skilled in the art, after understanding the invention, that changes and modification may be made therein without departing from the spirit or scope of the invention, and it is intended in the appended claims to cover such changes and modifications.

What is claimed is:

1. A collagen suture which is circular in cross-section comprising a laminated collagen tape having a multiplicity of extruded laminae consisting essentially of collagen fibrils oriented in a single direction and having throughout their entire length, in each lamina, undulations and typical banding at intervals of approximately 640 Angstrom units; substantially all of said fibrils having an alignment parallel to the longitudinal axis of the lamina which contains them; said laminae being disposed in parallel contiguity with respect to each other; and bonded to each other along their contiguous surfaces to form a unitary structure; and said unitary structure having a longitudinal axis in substantial parallelism with the longitudinal axis of the various laminae therein; said tape being of uniform width and thickness with substantially greater width than thickness and having opposed principal faces with substantially the same spacing throughout the extent of their areas; said tape being convoluted about its longitudinal axis with each convolution bonded with its adjacent convolutions.

2. A collagen suture which is circular in cross-section comprising a laminated collagen tape having a multiplicity of extruded laminae consisting essentially of collagen fibrils oriented in a single direction and having throughout their entire length, in each lamina, undulations and typical banding at intervals of approximately 640 Angstrom units; substantially all of said fibrils having an alignment parallel to the longitudinal axis of the lamina which contains them; said laminae being disposed in parallel contiguity with respect to each other; and bonded to each other along their contiguous surfaces to form a unitary structure; and said unitary structure having a longitudinal axis in substantial parallelism with the longitudinal axis of the various laminae therein; said tape being of uniform width and thickness with substantially greater width than thickness and having opposed principal faces with substantially the same spacing throughout the extent of their areas; said tape being convoluted about its longitudinal axis with each convolution bonded with its adjacent convolutions; said tape being impregnated with a collagen tanning agent substantially uniformly throughout its length and to a degree depending upon distance from the nearer of said principal faces; whereby the tanning throughout the collagenous article is substantially uniform.

References Cited

UNITED STATES PATENTS

| | | | |
|---|---|---|---|
| 2,039,262 | 4/1936 | Schulte | 128—335.5 |
| 2,747,228 | 5/1956 | Braun et al. | 264—212 X |
| 3,114,235 | 12/1963 | Griset | 57—157 |
| 3,114,373 | 12/1963 | Griset et al. | 128—335.5 |
| 3,114,591 | 12/1963 | Nichols et al. | 128—335.5 |
| 3,152,203 | 10/1964 | Dumitru | 264—212 |

FOREIGN PATENTS 851,720  10/1960  Great Britain.

DALTON L. TRULUCK, Primary Examiner

U.S. Cl. X.R.

161—227